Feb. 24, 1970   A. C. SCHICK   3,497,798
FLASHLIGHT TYPE TESTER WITH RESISTANCE HOT LINE AND
TIMING INDICATOR MEANS
Filed May 8, 1968   2 Sheets-Sheet 1
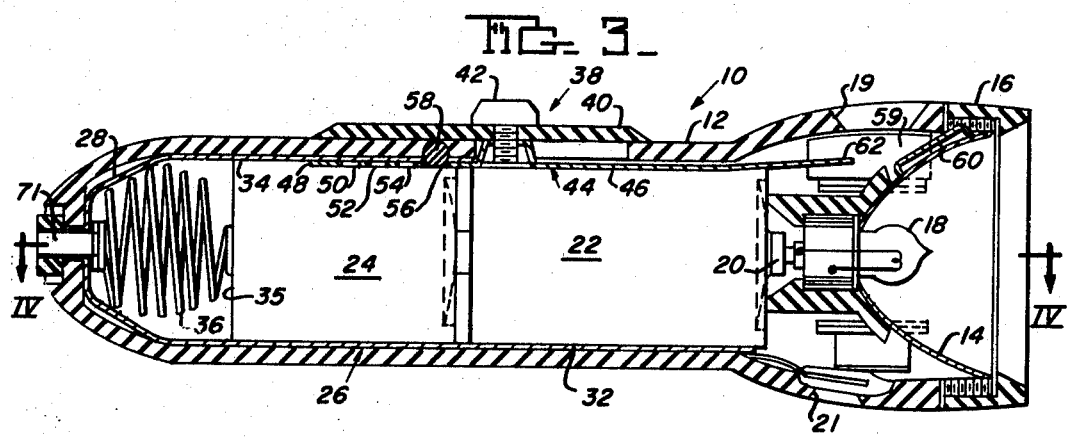
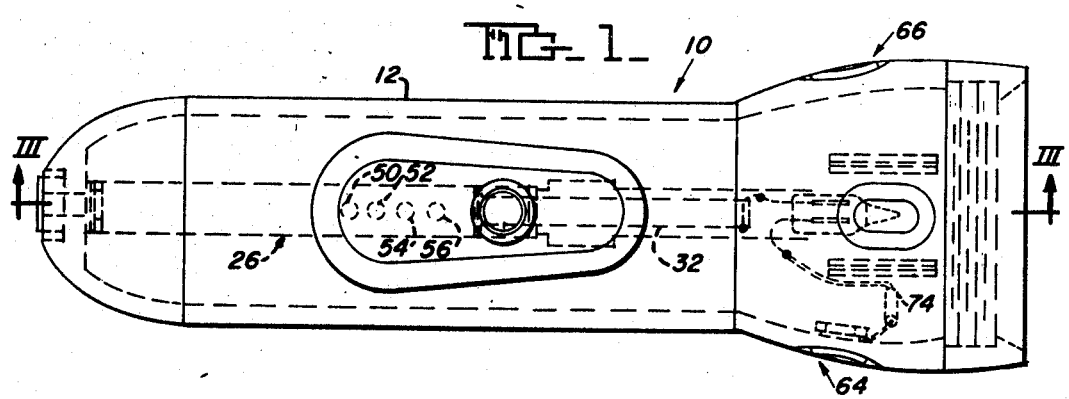
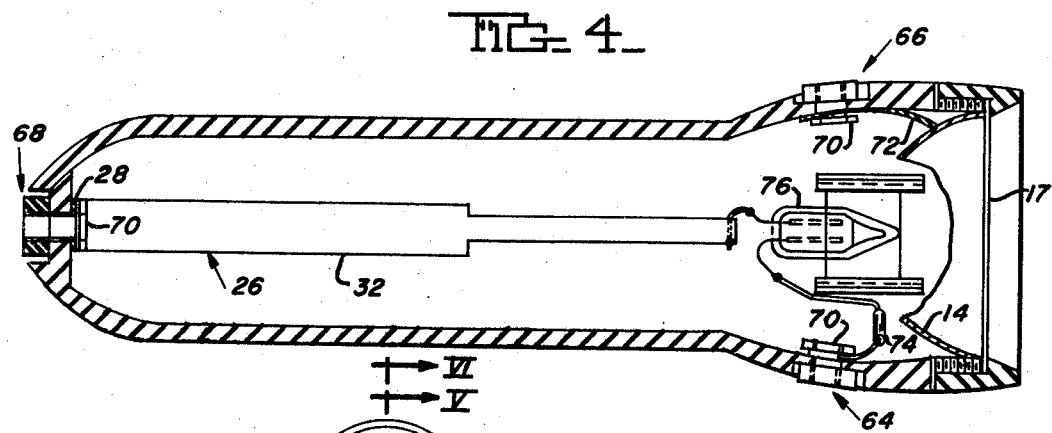
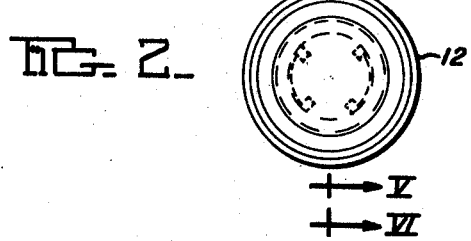
INVENTOR
ANDREW C. SCHICK
By
Attorney

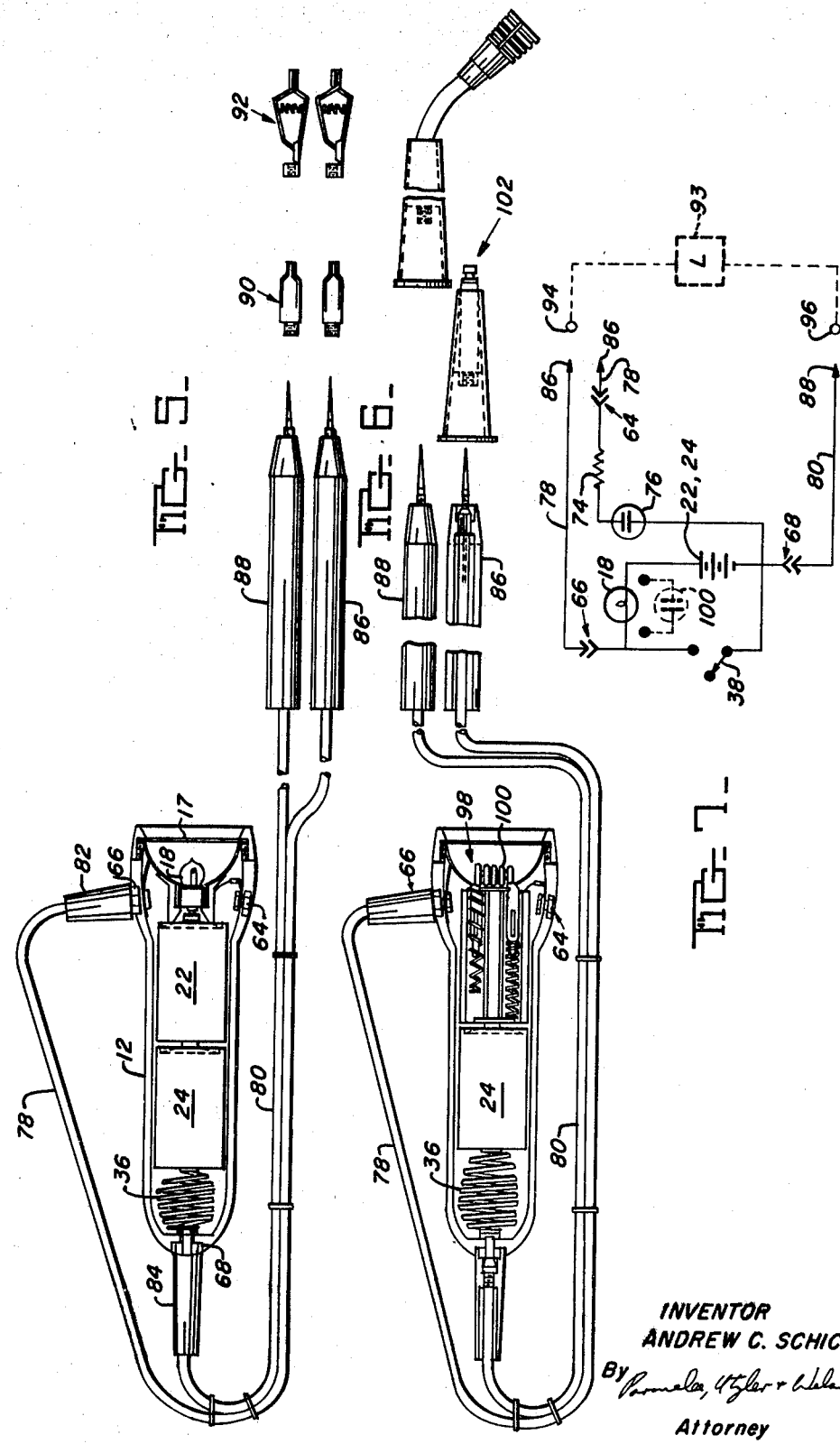

United States Patent Office 3,497,798
Patented Feb. 24, 1970

3,497,798
FLASHLIGHT TYPE TESTER WITH RESISTANCE, HOT LINE AND TIMING INDICATOR MEANS
Andrew C. Schick, 1234 Strawn Ave., New Kensington, Pa. 15068
Filed May 8, 1968, Ser. No. 727,401
Int. Cl. G01r 31/00
U.S. Cl. 324—53         7 Claims

ABSTRACT OF THE DISCLOSURE

A test instrument is disclosed for testing various types of electric circuits and for testing ignition timing and spark coil output of spark ignition internal combustion engines.

BACKGROUND OF THE INVENTION

Field of the invention

This invention relates generally to electrical circuits and more particularly to a portable test instrument having testing circuits mounted therein which can be readily connected to external circuits which are to be tested.

Description of the prior art

Various types of portable test instruments are known which embody both an ordinary flashlight and circuit tester. The patents to Costello and Borsody, Patent Nos. 2,846,644 and 2,540,471, respectively, are exemplary of such devices. Generally, these devices are limited to testing external electrical circuits of two types, namely, "cold" or non-energized circuits to determine if the circuit under test is "open," "closed" or has resistance therein, and "hot" or energized circuits to determine if in fact that the circuit under test is energized. Normally, a test neon tube is employed with the flashlight to make a "hot" test; while the usual batteries and lamp bulb of the flashlight are utilized in making a "cold" test. By reason of their construction, these prior art devices are limited in their application and cannot be used in testing spark ignition circuits of internal combustion engines, and if it were desired, for example, to test the timing or the output of an ignition coil, these prior art devices could not be used and other tests instruments would have to be employed to make these latter tests.

SUMMARY

Briefly, the present invention provides a test instrument comprising an insulator casing having a removable head construction and within the casing there is provided a source of electrical energy, an illuminating means and a test neon tube. Mounted on the casing are first, second and third jacks or sockets for connection to external circuits which are to be tested. There is also provided on the casing a multiple position slidable switch which includes a contact strip portion that is conductively and slidably connected to a metallic U-shaped conductor strip that is positioned within the casing and conductively connected to one pole of the source of electric energy and to one terminal of the test neon tube, the other terminal of the test neon tube being connected to the first jack. The illuminating means is positioned within the casing such that one of its terminals is conductively connected to the opposite pole of the source and the switch is arranged to be movable along the casing to move the contact strip portion thereof into and out of electrical contact with second terminal of the illuminating means. The second jack or socket is conductively connected to the first terminal of the illuminating means by means of a metallic contact strip that is fixedly mounted within the casing and the third jack or socket is conductively connected to the web portion of the U-shaped conductor strip.

As will be apparent hereinafter, the above described test instrument can be utilized for both "hot" and "cold" testing and by simple modification of the basic instrument by the removal of the normal lamp bulb and the replacement thereof with a second type illuminating means or neon tube timing light assembly, the test instrument can be readily converted to a timing indicator. Also, by reason of its construction, the test instrument can be employed to test the output of an ignition coil, a test generally not possible with the type device over which the present invention is an improvement.

Further aims, advantages and capabilities of the invention will become apparent from the following description, taken in conjunction with the accompanying drawings showing only a preferred embodiment of the invention.

BRIEF DESCRIPTION OF THE DRAWINGS

FIGURE 1 is a plan view in elevation of a test instrument embodying features of the present invention;

FIGURE 2 is an end view in elevation looking towards the lens of the test instrument shown in FIG. 1;

FIGURE 3 is a sectional view taken along the line III—III of FIG. 1;

FIGURE 4 is a sectional view taken along the line IV—IV of FIG. 3;

FIGURE 5 is a sectional view taken along the line V—V of FIG. 2 and showing testing leads for conductively connecting the test instrument to the terminals of an external circuit which is to be tested and also showing screw type adapters for use with the testing leads;

FIGURE 6 is a sectional taken along the line VI—IV of FIG. 2 and showing a timing light assembly within the casing of the test instrument rather than the lamp bulb as is shown in FIG. 5; and FIGURE 7 is an electrical schematic of the wiring or test circuits of the testing instrument of the present invention.

DESCRIPTION OF THE PREFERRED EMBODIMENT

Referring now to the drawings wherein like reference numerals indicate like parts throughout the several views, 10 designates a portable test instrument according to the present invention, and comprises a cylindrical hollow insulator casing 12 provided at its forward end with a reflector shell 14, and a cover 16 having a lens 17 therein. The forward end of the casing 12 is also provided with a pair of viewing ports 19 and 21 for a purpose to be explained below. The reflector shell 14 is provided with a suitable lamp socket in which is secured a source of illumination or incandescent lamp bulb 18. One terminal of the lamp 18 is in direct electrical contact with the center terminal or pole 20 of the source of electrical energy or battery 22. Another battery 24 is connected in series with the battery 22.

Mounted within the casing 12 is a metallic, generally U-shaped conductor strip 26, having its web portion 28 lying across the rear end 30 of the casing 12 and having its leg portions 32 and 34 extending forwardly along the opposite inner faces of the casing 12. The central web portion 28 is conductively connected to the opposite pole 35 of the battery 24 through a metallic battery supporting spring 36.

Atop the casing 12 and intermediate its forward and rear ends there is provided a multiple position slidable thumb switch shown generally at 38 which comprises an insulator portion 40 on the outside of the casing 12 that is secured by an insulated threaded screw 42 to a metallic contact strip 44 located within the casing 12. The contact strip portion 44 has a forwardly extending portion 46 and a rearwardly extending portion 48. The portion 48 is provided with four openings 50, 52, 54 and 56, that alternately receive a fixed small round ball 58 that is mounted between the inner face of the casing and the portion 48 as the insulator portion 40 of the switch is slid along the casing 12, with the mating of a given opening with the ball locking the switch in place. Sliding the insulator portion 40 of the switch 38 along the casing 12 causes the gap 59 between a contact bar 60 provided on the reflector shell 14 and the end 62 of the portion 46 to close, and when contact is made between the end 62 and the contact bar 60, there is an electrical connection between the second terminal of the bulb and the opposite pole 35 of the battery 24, the connections being made through the shell 14, bar 60 and contact strip 44 which is slidably engaged with the leg 34 of U-shaped conductor strip 26. With the contact strip 44 in conductive contact with the second terminal of the lamp, the lamp will light in the manner of a common flashlight.

Referring now more particularly to FIG. 4, the casing 12 is provided adjacent its forward end with first and second jacks or sockets 64 and 66, respectively, and mounted on its rear end is a jack or socket 68. Each of the sockets are similar and each is secured to the casing by nuts 70 that are screwed on to the threaded neck portions 71 of the sockets which extend into the casing.

The socket 66 is internally connected to the shell 14 by means of a fixed metallic contact strip 72 and as a result is also connected to the first terminal of the lamp bulb 18. The socket 68 is conductively connected to the web portion 28 of the U-shaped conductor strip 26. And, the first socket 64 is internally connected to a dropping resistor 74 which is in turn connected in series with one terminal of a test neon tube 76 that is mounted within the casing 12. The second terminal of the neon tube 76 is connected to the leg 32 of the U-shaped conductor strip 26. Referring now more particularly to FIG. 5 and the wiring diagram of FIG. 7, there is provided for connection with the sockets 64, 66, and 68 test leads 78 and 80 having plugs 82 and 84 on one end thereof and test probes 86 and 88 on their opposite ends for connecting the test instrument 10 to an external circuit. There is also shown in FIG. 5 various types of screw-on adaptors for attachment to the test probes 86 and 88 and there are indicated generally by the reference numerals 90 and 92.

To make a "cold" test such as a continuity test, the plug ends of the test leads 78 and 80 are inserted into the sockets 66 and 68, respectively, and the test probes 86 and 88 are brought into contact with the terminals of the circuit under test which is here shown diagrammatically at 93 and with the terminals thereof being designated at 94 and 96. If there is a complete circuit, there will be a current flow through the test probe 86, test lead 78, lamp 18, batteries 22, 24, test lead 80, probe 88 and the external circuit 93 and the lamp 18 will light. The switch 38 is in the open position during a cold test.

To test a "hot" circuit of 110 v. to 550 v., for example, lead 78 is removed from the socket 66 and is plugged into the socket 64. The test probes are applied across the terminals 94 and 96, and for the purpose of describing this test it will be assumed that the circuit 93 is an energized circuit, for example, it may be part of a house circuit and the terminals 94 and 96 may be the opposite openings of a wall socket. As the circuit to be tested has been assumed to be energized there will be a complete circuit through probe 86, lead 78, dropping resistor 74 and neon bulb 76 test lead 80, the external circuit 93 and the bulb 76 will glow and be visible through the port 21 to indicate the complete circuit. The switch 38 may be open or closed as desired during a "hot" test which is a desirable feature in that the lamp 18 may be lit when checking circuits after a fuse has blown and there is no other source of light available.

Referring now more particularly to FIG. 6, and comparing it with FIG. 5, it will be noted that one of the batteries, the reflector shell 14 and bulb 18 have been removed and replaced with the assembly 98 which includes a neon timing lamp 100. With this arrangement, the testing instrument 10 can be utilized as an ignition timing device for spark ignition engines or the like. To use the testing instrument 10 as a timing device, the test leads 78 and 80 are connected thereto as they would be in a "cold" test and the test probes 86 and 88 are adapted for this test by the use of the screw-on adapters indicated generally at 102. The converted test probes are then connected to the number one spark plug and its spark plug wire in the usual manner of connecting timing lights and the neon timing light will flash on and off as the spark plug fires. Accordingly, the one making the test can visually observe the flashing of the neon tube 100 and determine the proper engine timing and firing of the spark plugs in the manner known to those skilled in the art.

To utilize the test instrument 10 to check the output of the ignition coil of an automobile, the bulb 18, the batteries 22 and 24 and the spring 36 are removed therefrom and the screw-on adapters 90 are screwed onto the test probes 86 and 88 and the test leads are plugged into the sockets 66 and 68. The test probe 86 is inserted into the center terminal of the ignition coil and the test probe 88 is inserted into the center terminal of the distributor cap and the switch 38 is slid forward along the casing until the end portion 62 of the contract strip portion of the switch 38 is in contact with the contact bar 60. The motor is then started and with the motor running at a given speed, the switch 38 is slid rearwardly along the casing to establish an air gap 59 across which a steady arc will appear and it will be viewable through the port 19 at the forward end of the casing. If the cold is not defective, such an arc will be established, however, if the coil is defective, the arc will not be steady and by observing the arcing across the air gap it can be determined if the coil is weak and not providing a sufficient output at the given speed for proper operation of the automobile. By increasing and decreasing the length of the air gap and increasing and decreasing the speed of the motor, the one making the test can observe the nature of the arcing across the air gap and determine if the coil output is suitable.

From the foregoing it will be understood that I have provided a portable test instrument having a wider range of uses than has been heretofore available in test instruments of the type over which the present invention is an improvement and that I have herein merely described and shown illustrative embodiments of the invention and merely described a number of possible uses of the invention. It is to be understood, however, that the invention and its uses are not limited to what has been described but that other constructions, arrangement of parts, details and features and uses may be made of the invention without departing from the spirit and scope of the appended claims.

I claim:
1. A test instrument comprising
(a) an insulator casing having forward and rear ends,
(b) a source of electrical energy within the casing,
(c) an illuminating means within the casing having first and second terminals with the first terminal being conductively connected to one pole of the source,
(d) a metallic U-shaped conductor strip within the casing having the web portion thereof lying across the rear end of the casing and conductively connected to the opposite pole of the source and having the leg portions thereof extending forwardly along the opposite inner faces of the casing,
(e) a slidable switch mounted on the casing intermediate its forward and rear ends having an insulator portion outside the casing and a forwardly extending metallic contact strip portion within the casing conductively connected to and slidably engaged with one of the forwardly extending legs of the U-shaped conductor strip, the insulator portion of the switch being slidable along the casing to move the contact strip portion thereof into and out of electrical contact with the second terminal of the illuminating means, (f) a first socket mounted on the casing for electrical connection to an external circuit, (g) a test neon tube mounted within the casing having a first terminal conductively connected to the opposite leg of the U-shaped conductor strip and a second terminal conductively connected to the first socket, (h) a second socket mounted on the casing for electrical connection to an external circuit, (i) a fixed metallic contact strip within the casing conductively connected to the second socket and to the first terminal of the illuminating means, and (j) a third socket mounted on the casing for electrical connection to an external circuit and being conductively connected to the web portion of the U-shaped conductor strip.

2. A test instrument as defined in claim 1 including means for conductively connecting the third socket to one terminal of an external circuit which is to be tested and means for conductively and selectively connecting either one of the first and second sockets to the second terminal of the circuit which is to be tested.

3. A test instrument as defined in claim 1 wherein the first and second sockets are mounted on the casing adjacent the forward end thereof and the third socket is mounted on the rear end of the casing.

4. A test instrument as defined in claim 1 wherein the illuminating means is an incandescent electric lamp bulb.

5. A test instrument as defined in claim 1 wherein the illuminating means is a neon tube timing light.

6. A test instrument as defined in claim 1 including a first view port in the casing adjacent the forward end thereof to permit viewing of the test neon tube.

7. A test instrument as defined in claim 6 including a second view port in the casing to permit viewing of the contact strip portion of the switch as it is moved into and and out of electrical contact with the second terminal of the illuminating means.

References Cited
UNITED STATES PATENTS

| | | | |
|---|---|---|---|
| 2,231,660 | 2/1941 | Carlotti et al. | 324—53 |
| 2,413,484 | 12/1946 | Berger | 324—53 |
| 2,540,471 | 2/1951 | Borsody | 324—53 |
| 2,564,166 | 8/1951 | Marinello | 324—53 |
| 2,687,508 | 8/1954 | Noyes | 324—53 |
| 2,703,385 | 3/1955 | Curd | 324—53 |
| 3,145,337 | 8/1964 | Lipson | 324—53 |

GERARD R. STRECKER, Primary Examiner